(12) United States Patent
Imamura et al.

(10) Patent No.: US 6,689,018 B2
(45) Date of Patent: Feb. 10, 2004

(54) SHIFT CONTROL SYSTEM FOR AUTOMATIC TRANSMISSION

(75) Inventors: Tatsuya Imamura, Fuji (JP); Osamu Sato, Fuji (JP); Kazuhiro Takatori, Fuji (JP); Yasushi Fujita, Fuji (JP); Kazuhito Sano, Fuji (JP); Kazuo Tomioka, Fuji (JP)

(73) Assignee: Jatco LTD (JP)

( * ) Notice: Subject to any disclaimer, the term of this patent is extended or adjusted under 35 U.S.C. 154(b) by 0 days.

(21) Appl. No.: 10/118,525

(22) Filed: Apr. 8, 2002

(65) Prior Publication Data

US 2002/0177505 A1 Nov. 28, 2002

(30) Foreign Application Priority Data

Apr. 11, 2001 (JP) ........................ 2001-112439

(51) Int. Cl.[7] .............................................. F16H 61/26
(52) U.S. Cl. ........................................ 477/156; 701/61
(58) Field of Search ................................ 477/143, 154, 477/155, 156; 701/51, 55, 56, 61, 67

(56) References Cited

U.S. PATENT DOCUMENTS

| | | | | |
|---|---|---|---|---|
| 4,667,540 A | * | 5/1987 | Yagi | 701/60 |
| 4,707,789 A | * | 11/1987 | Downs et al. | 701/58 |
| 4,724,723 A | * | 2/1988 | Lockhart et al. | 477/102 |
| 5,046,383 A | * | 9/1991 | Butts et al. | 477/120 |
| 5,058,460 A | * | 10/1991 | Hibner et al. | 477/154 |
| 5,129,286 A | * | 7/1992 | Nitz et al. | 477/102 |
| 5,882,276 A | * | 3/1999 | Usuki et al. | 477/120 |
| 6,098,003 A | * | 8/2000 | Kozaki et al. | 701/51 |
| 6,364,811 B1 | * | 4/2002 | Hubbard et al. | 477/143 |
| 6,464,617 B1 | * | 10/2002 | Lee | 477/154 |

* cited by examiner

Primary Examiner—Rodney H. Bonck
Assistant Examiner—David D. Le
(74) Attorney, Agent, or Firm—Rossi & Associates (57) ABSTRACT

An automatic transmission has a gear transmission mechanism with engaging devices. Up-shifting is achieved with oil pressure, which is controlled with an open control component, a gradient of which is determined based on input torque, and a feedback control component, which is based on a target gear ratio. To prevent shock during an up-shift caused by releasing the accelerator, the feedback control component is set to zero when the amount of change in the throttle opening is equal to or greater than a predetermined threshold value. As a result of inhibiting increase in feedback to make up for a tendency for oil pressure depending on an open control component to decrease as a result of the throttle opening reducing and input torque falling, increase of the oil pressure command value becomes smooth. Peaks of the output torque are therefore suppressed.

9 Claims, 11 Drawing Sheets

SHIFT CONTROL SYSTEM FOR AUTOMATIC TRANSMISSION

BACKGROUND OF THE INVENTION

1. Field of the Invention

The present invention relates to a shift control system for automatic transmission, especially to a hydraulic control system for up-shift.

2. Description of the Prior Art

Figure 12:
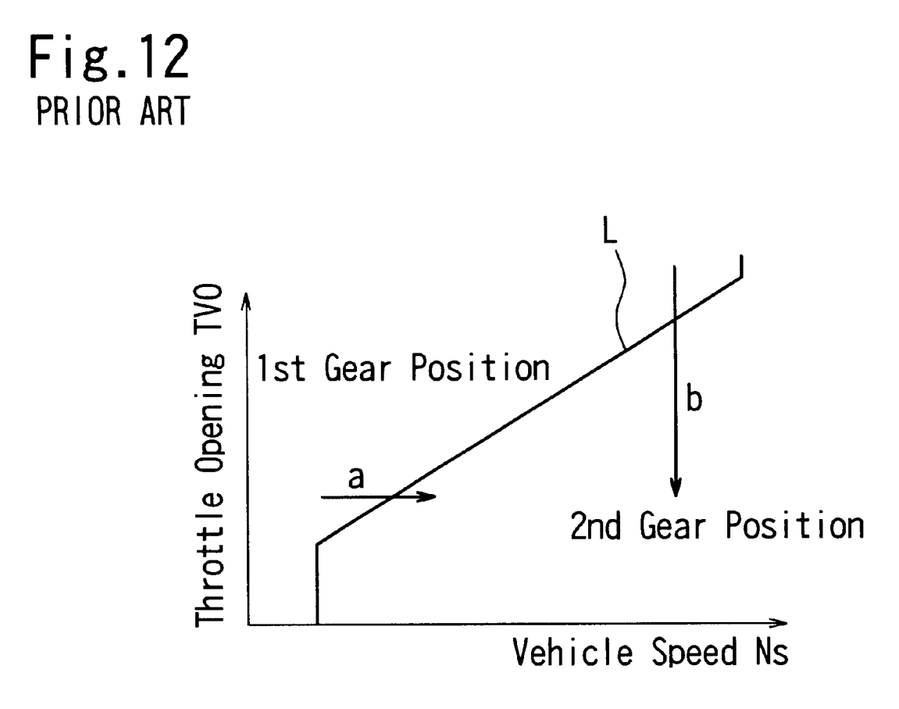
FIG. 12 is a view showing an example of a gear shift line.

In an automatic transmission for a vehicle, there is provided a gear transmission mechanism which has a plurality of engaging devices acting under oil pressure, and a prescribed gear position is selected based on the running condition of the vehicle, so as to change the gear ratio by engaging and disengaging the engaging devices. As shown in FIG. 12, there is set a gear shift line L showing the relationship between the opening of the throttle valve (throttle opening TVO) based on the operation of the accelerator pedal and the vehicle speed Ns, and the gear position is changed when the running condition of the vehicle changes across the gear shift line L.

For example, when the vehicle speed increases while the throttle opening TVO is substantially constant as shown by arrow "a" or is changing gently, oil pressure for the engaging devices are controlled based on an up-shift command. An up-shift while the throttle opening is substantially constant or slowly changing is referred to as an auto up-shift, with cases of an engine speed of around 3000 rpm being particularly prevalent.

This oil pressure control during gear shifting is performed as a combination of open control where oil pressure is increased according to increases in the input torque of the gear transmission mechanism and feedback control corresponding to gear shift transitions. The object of feedback control is to prevent the occurrences of shocks due to large changes in output shaft torque of a gear transmission mechanism during gear shifting, and sets a target gear ratio for the process of switching from a gear ratio of the gear position before shifting to a gear ratio of the gear position after shifting, and ensures that this target gear ratio is maintained.

Figure 13A:
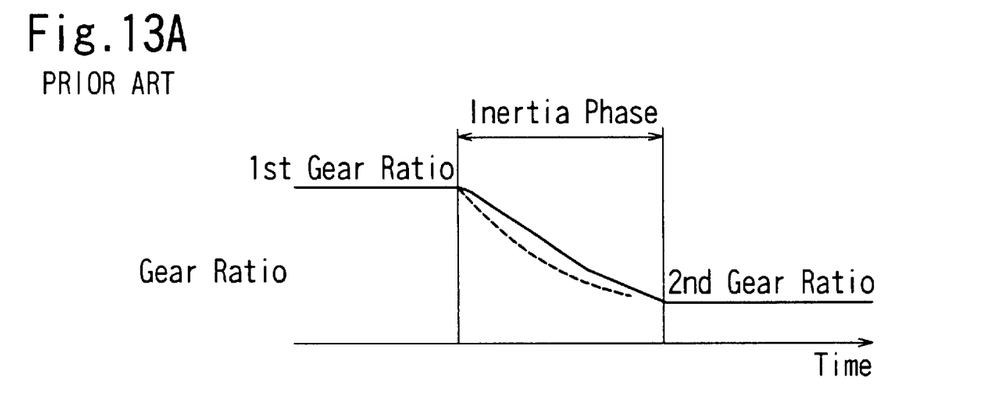
FIGS. 13A to 13C are graphs showing changes in parameters during auto up-shift.
Figure 13B:
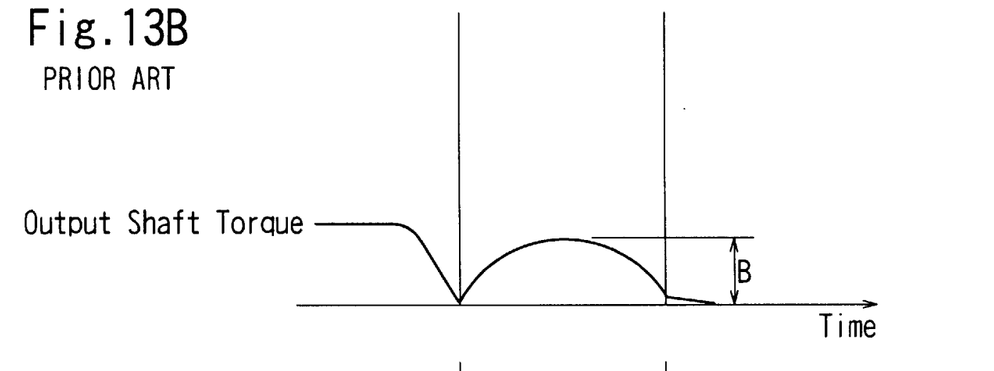
Figure 13C:
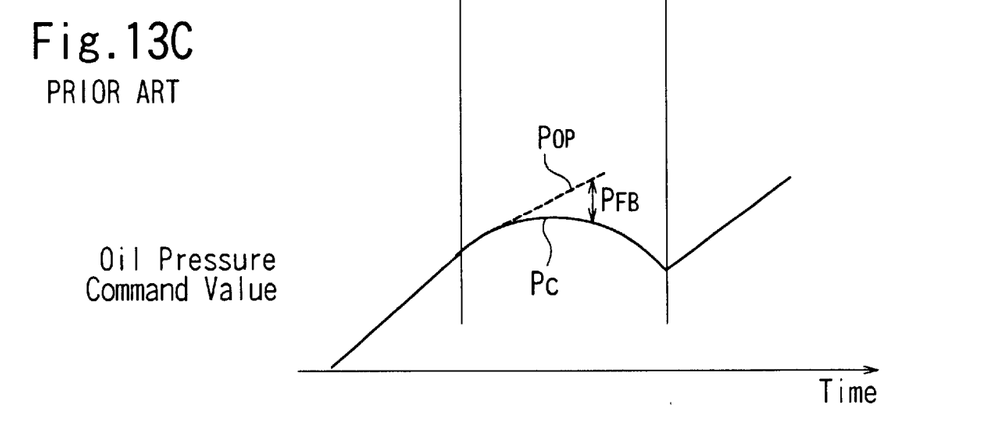

FIG. 13 shows the relationship between gear ratio, output shaft torque of the gear transmission mechanism, and oil pressure command value at the time of auto up-shift.

When there is a shift command to shift from a first gear position to a second gear position, an open control component POP having a gradient based on input torque at this time is first set as an oil pressure command value in an inertia phase after a standby phase. Changes in gear ratio due to the open control component is as shown by the broken line in FIG. 13A. However, in order to suppress the amount of change (step difference) in the output shaft torque shown in FIG. 13B to a predetermined amount B so as to absorb energy of the change in torque, the target gear ratio is set to that shown by the solid line in FIG. 13A.

As shown in FIG. 13C, the oil pressure command value is set at Pc, which is obtained by correction of the open control component POP using the feedback control component PFB, so as to make the gear ratio in line with the aforementioned target gear ratio.

Accordingly, intermediate large changes in output shaft torque are suppressed so as to give gear shift with no shock.

However, in the related art, control of oil pressure combining this open control and feedback control has been carried out uniformly during gear shifting. This invites the problem of shocks under different gear shift conditions, although shocks are effectively prevented during auto up-shift.

Namely, an up-shift from the first gear position to the second gear position also occurs when the throttle opening TVO changes across the gear shift line L, as shown by arrow b in FIG. 12, when a foot depressing the accelerator pedal is released.

Such up-shift due to foot release starts at a high engine speed in the region of 6000 rpm, as compared to auto up-shift.

Figure 14A:
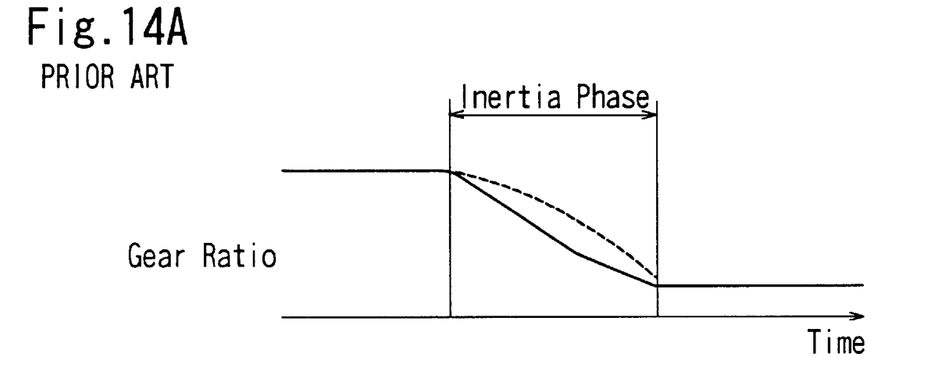
FIGS. 14A to 14C are graphs showing changes in parameters during up-shift due to releasing a foot from the accelerator pedal in a prior art example.

In this case, the input torque is reduced due to the reducing of throttle opening TVO, the gradient of the open control component POP becomes small, the rate of the rise in oil pressure becomes lower, and the engine speed is in the high region. Therefore, the gear ratio changes as shown by the broken line in FIG. 14A, and the gear shifting tends to become delayed.

Figure 14B:
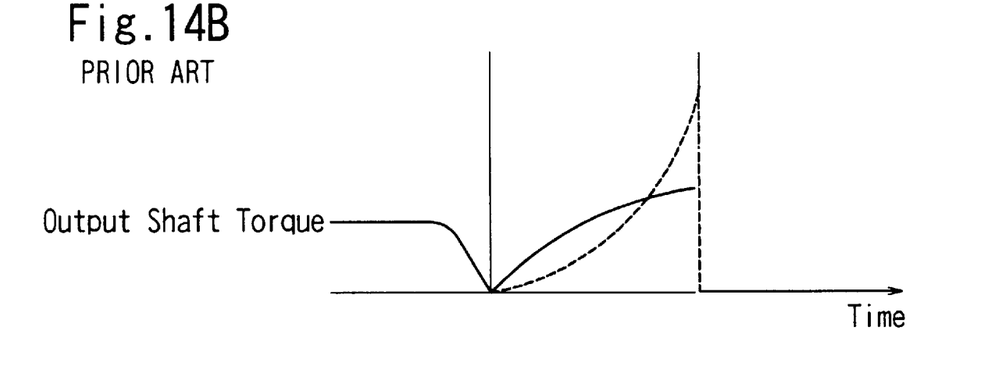
Figure 14C:
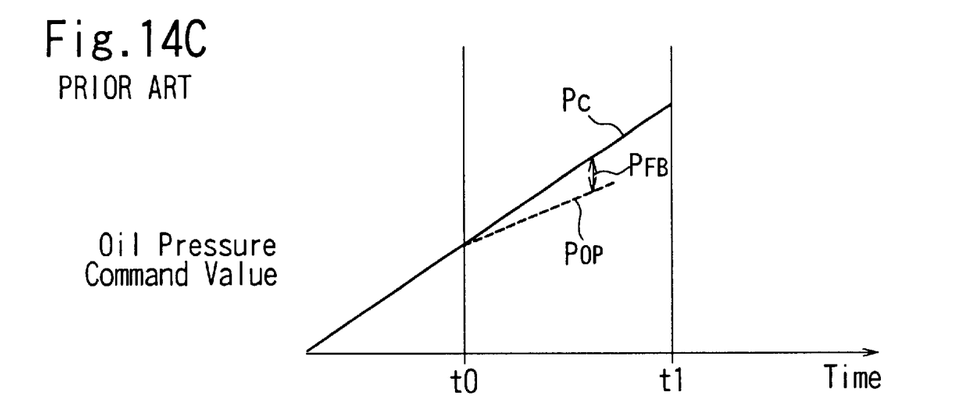

An oil pressure command value Pc, which is obtained by correction of an open control component POP using the feedback control component PFB for making the gear ratio in line with the target gear ratio, is therefore large as shown by the solid line in FIG. 14C compared with a case in which only an open control is adopted.

During this time, as shown in FIG. 14B, output shaft torque of the gear transmission mechanism rises smoothly at the beginning because the gradient of the open control in the initial period of the gear shift in the inertia phase starting at time t0 is small, and then abruptly rises from the latter half to the final period. If it is assumed that the input torque is the same as during auto up-shift, the energy it is intended to absorb for the change in torque is also the same. Therefore, the energy that is not absorbed in the initial gear shift period has to be absorbed in the latter half.

The step difference of the output shaft torque occurring at a gear shift end time t1 therefore becomes particularly large and a shock occurs.

SUMMARY OF THE INVENTION

It is therefore the object of the present invention to provide a shift control system for automatic transmission in which shocks do not occur even at the up-shift caused by releasing a foot from accelerator pedal.

In order to achieve this object, the present invention provides a shift control system for automatic transmission, the transmission being equipped with engaging devices in a gear transmission mechanism, and when up-shifting from a first gear position to a higher second gear position, oil pressure command value for an engaging device used in the up-shift is made up of an open control component, the gradient of which is determined based on input torque, and a feedback control component based on a target gear ratio, wherein the feedback control component is decreased when the amount of change in a throttle opening at the time of the up-shift is equal to or greater than a predetermined threshold value.

The phenomena where a shock occurs due to excessive feedback corresponding to the gradient of the open control component is prevented at the time of up-shift caused by releasing a foot from the accelerator pedal, when throttle opening is dramatically reduced so that the input torque is also reduced so as to make the gradient of the open control component small.

DETAILED DESCRIPTION OF THE PREFERRED EMBODIMENTS

The present invention will now be described in detail with reference to the drawings showing an embodiment thereof.

Figure 1:
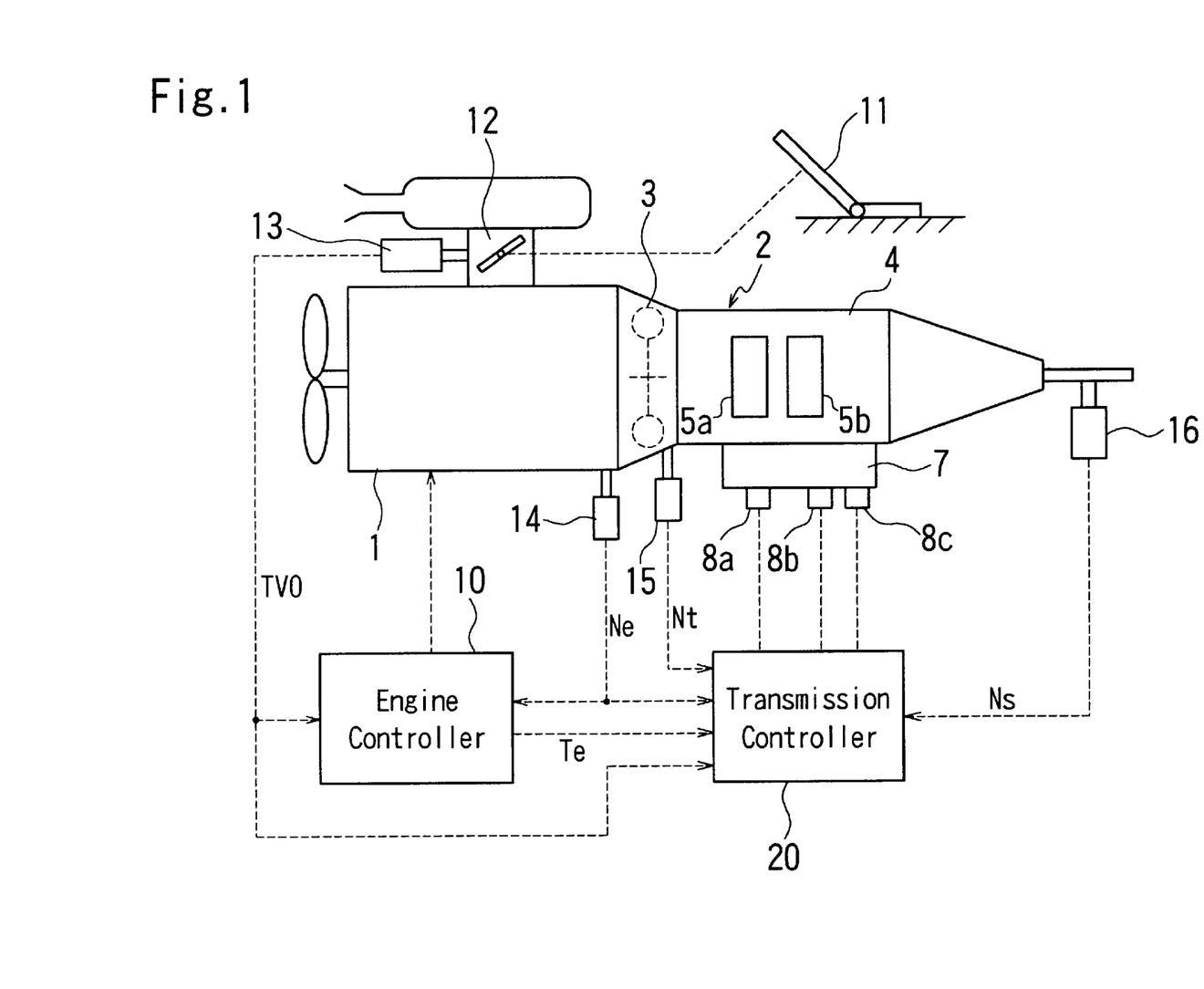
FIG. 1 is a view showing a vehicle drive system in an embodiment of the present invention.

FIG. 1 is a diagram showing a vehicle drive system equipped with an automatic transmission according to a first embodiment.

An automatic transmission 2 comprised of a torque converter 3 and a gear transmission mechanism 4 is connected to an engine 1 so that output of the gear transmission mechanism 4 is transmitted to wheels via differential/final reduction gear (not shown).

The gear transmission mechanism 4 is equipped with a plurality of engaging devices 5a, 5b operated by oil pressure. A prescribed plurality of gear positions can then be implemented by switching over rotation transmission paths by switching over combinations of engaging and disengaging of the engaging devices.

A control valve 7 for shift control is equipped with a plurality of solenoids 8 (8a to 8c) for controlling oil pressure to the engaging devices.

A throttle sensor 13 and an engine speed sensor 14 are connected to the engine controller 10 controlling the engine 1. A signal showing the opening of the throttle valve 12 of the engine 1 (throttle opening TVO), the throttle valve 12 being opened and closed based on the operation of the accelerator pedal 11, and a signal showing the rotational speed of the output shaft of the engine (engine speed Ne) are inputted to the engine controller 10. The engine controller 10 then obtains the required engine torque Te based on these signals and controls the amount of fuel injected into the engine 1 and the ignition timing.

Signals of the throttle opening TVO from the throttle sensor 13 and the engine speed Ne from the engine speed sensor 14 are inputted to a transmission controller 20 for controlling the automatic transmission 2, and a signal of engine torque Te from the engine controller 10 is also inputted to the transmission controller 20.

The transmission controller 20 further receives signals of a turbine speed Nt from the turbine sensor 15 and the vehicle speed Ns from a vehicle speed sensor 16, and generates a shift command based on the running condition of the vehicle, and also calculates oil pressure command value for duty control of the solenoids 8.

The transmission controller 20 calculates a slip ratio of the torque converter 3 from the engine speed Ne and the turbine speed Nt and obtains the engine torque from the engine controller 10, then calculates the input torque for the gear transmission mechanism 4.

The gradient of the open control component POP of the oil pressure command value is then set based on this input torque. This gradient is prepared in advance as a map and a value corresponding to the input torque can be read out.

In order to suppress the amount of change in the torque of the output shaft of the gear transmission mechanism 4 to a predetermined value, a target gear ratio is set. The feedback control component PFB is calculated in line with this target gear ratio and the oil pressure command value Pc is determined by the calculation of Pc=POP+PFB.

At the time of up-shift caused by change in the throttle opening resulting from releasing a foot from the accelerator pedal, the transmission controller 20 sets the feedback control component PFB of the oil pressure command value Pc to 0 (zero) so as to inhibit feedback control when the amount of change in the throttle opening is a predetermined threshold value or more.

Figure 2:
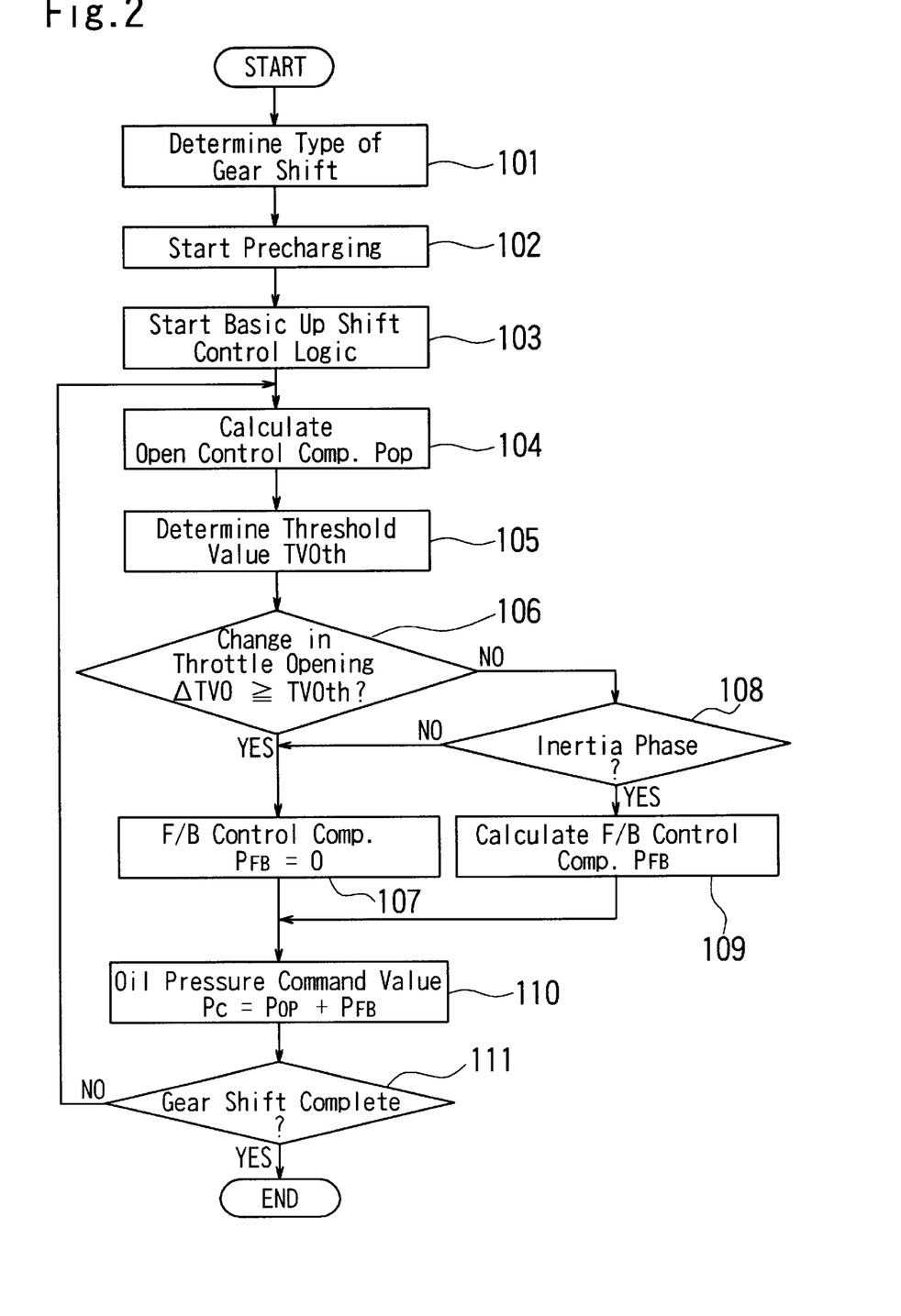
FIG. 2 is a flowchart showing the flow of oil pressure command value control during up-shift in a first embodiment.
Figure 3A:
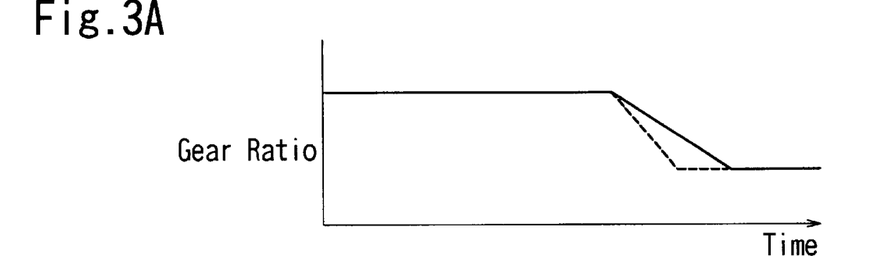
FIGS. 3A to 3D are graphs showing changes in parameters during up-shift control.

The flow of control of the oil pressure command value during up-shift at the transmission controller 20 is described with reference to FIGS. 3A–3D using the flowchart in FIG. 2. FIG. 3A shows change in gear ratio, FIG. 3B shows change in the throttle opening, FIG. 3C shows change in oil pressure command value, and FIG. 3D shows change in transmission output shaft torque.

Figure 3B:
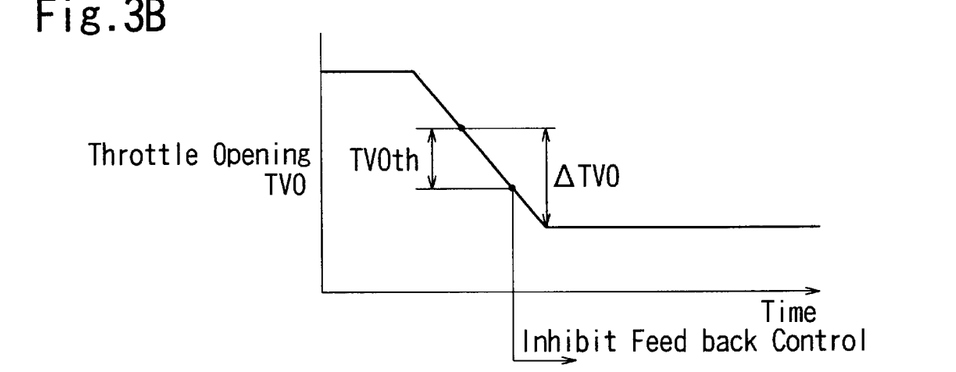

When it is detected from the throttle opening TVO and the vehicle speed that the running condition of the vehicle has crossed the gear shift line at time t0 shown in FIG. 3B, first, in step 101, the transmission controller 20 determines a type of gear shift, i.e. from what gear position to what gear position, such as from second gear position to third gear position.

Figure 3C:
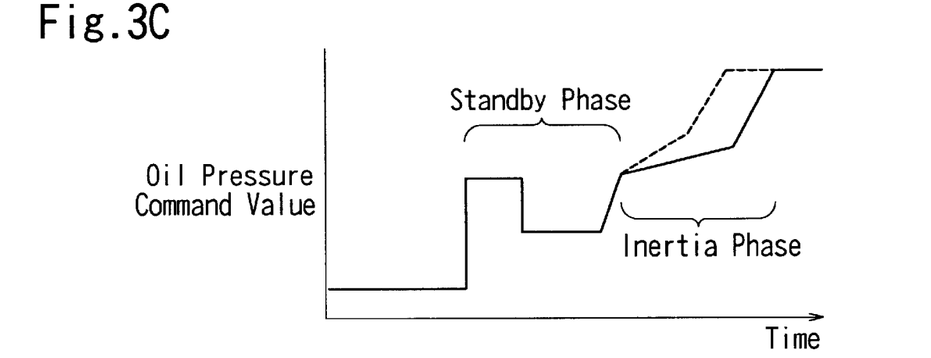
Figure 3D:
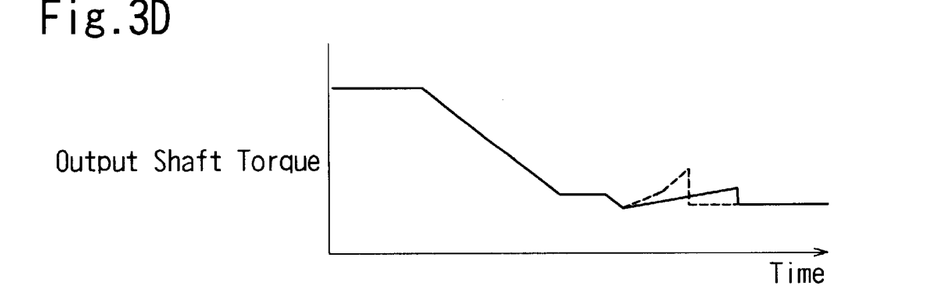

In step 102, as shown in FIG. 3C, precharging of an engaging device 5a that is to be engaged in that gear shifting is started as a standby phase, and in step 103, basic up-shift control logic is started.

With basic up-shift control logic, commencement of the inertia phase is detected by detecting the start of changing of the gear ratio, and controls such as setting of the basic target gear ratio during the inertia phase and returning the oil pressure command value to maximum on detection of the end of gear shift from the gear ratio are carried out. The gear ratio is obtained as the ratio of the turbine speed Nt and the vehicle speed Ns.

In step 104 the open control component POP for the oil pressure command value is calculated. In this step, the input torque to the gear transmission mechanism 4 is obtained first, and then the gradient is read from the map set in advance based on this input torque, and the open control component POP is calculated as a straight line having this gradient.

Next, in step 105, a threshold value TVOth is determined for the difference between the throttle opening before releasing the foot from the accelerator pedal 11 and the throttle opening after releasing the foot, i.e. the amount of change ΔTVO of the throttle opening.

Figure 4:
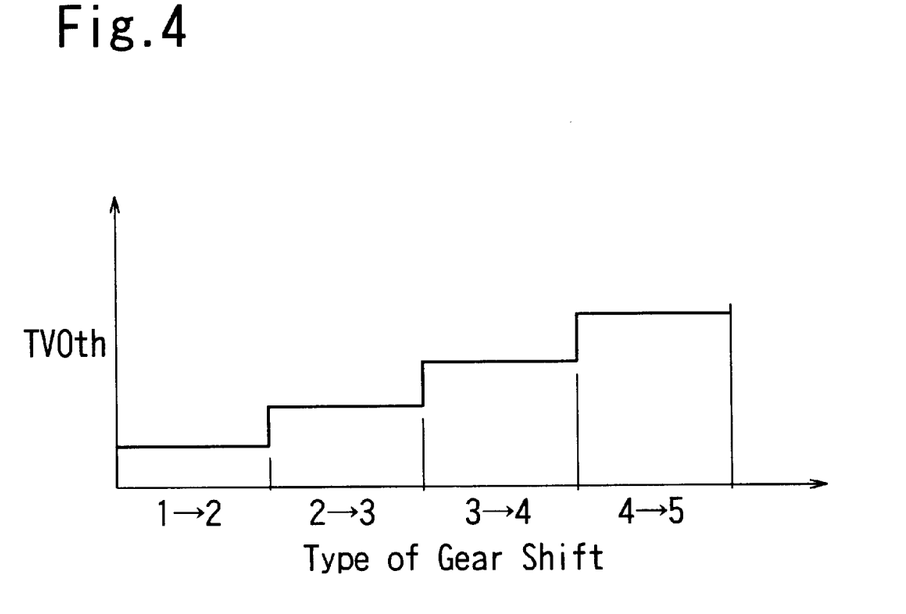
FIG. 4 is a view showing a setting of threshold value for the amount of change in the throttle opening.

The threshold value TVOth is preset according to the type of gear shift, and as shown in FIG. 4, is set small for gear shifts between low gear positions such as from first gear position to second gear position (1 to 2), and is set to be relatively large for gear shifts between high gear positions such as, for example, from fourth gear position to fifth gear position (4 to 5).

This is to provide compatibility with the fact that a change in the engine speed is greater for gear shifts between low gear positions and the feedback control component is also large, thus the peak of the output torque at the end of gear shifting tends to become high due to excessive feedback.

In step 106, a check is made as to whether or not a change ΔTVO in the throttle opening is greater than or equal to the threshold value TVOth.

If the change in the throttle opening is greater than or equal to the threshold value for the type of gear shift determined in step 101, i.e. ΔTVO≧TVOth, then the process proceeds to step 107, the feedback control component PBF is set to 0, and feedback control is inhibited.

On the other hand, if ΔTVO<TVOth, the process proceeds to step 108, and a check is made as to whether or not the gear shifting has entered inertia phase that is the control region where the feedback control should be adopted.

When the gear shifting has entered inertia phase, the process proceeds to step 109, and the feedback control component PFB is calculated for the basic target gear ratio.

When the gear shifting has not entered inertia phase, the process proceeds to Step 107, and the feedback control component PFB is put to zero (PFB=0).

After step 107 and step 109, instep 110, the feedback control component PFB is added to the open control component POP and the oil pressure command value Pc is obtained. The duty of the solenoid 8 is then controlled based on this oil pressure command value Pc and the gear shifting process is proceeded.

In the inertia phase, the oil pressure command value Pc including the feedback control component PFB calculated in step 110 conforms to the basic up-shift control logic and is shown by the broken line in FIG. 3C and correspondingly by the broken lines in FIG. 3A, FIG. 3B and FIG. 3D.

When the feedback control component PFB is taken to be zero, an oil pressure command value Pc for only the open control component POP is shown to gently increase as shown by the solid line in FIG. 3C. As shown in the results in FIG. 3D, the torque of the output shaft of the gear transmission mechanism 4 is kept low as shown by the solid line with respect to the broken line for shocks protruding in a peak shape including the feedback control component PFB, so that a shock does not occur.

Step 104 onwards are then repeated until the gear shift is complete, with this up-shift control then being finished when end of the gear shift is detected in step 111.

In the embodiment as described above, in oil pressure control during up-shift where the oil pressure command value is made up of an open control component POP set corresponding to the input torque and a feedback control component PFB for the target gear ratio, the feedback control component PFB is decreased to 0 when the amount of change ΔTVO in the throttle opening is greater than or equal to a predetermined threshold value TVOth. As a result, at the time of up-shift caused by releasing a foot from the accelerator pedal, the phenomena where a shock occurs due to excessive feedback corresponding to the decreasing gradient of the open control component POP by reason of the decreasing input torque is prevented.

Further, the threshold value TVOth is made to change according to the type of gear shift, and is set to be small for gear shift between low gear positions. Shocks can therefore be reliably prevented even when shifting between low gear positions in which the change in engine speed is large, and prompt up-shift can therefore be achieved.

Figure 5:
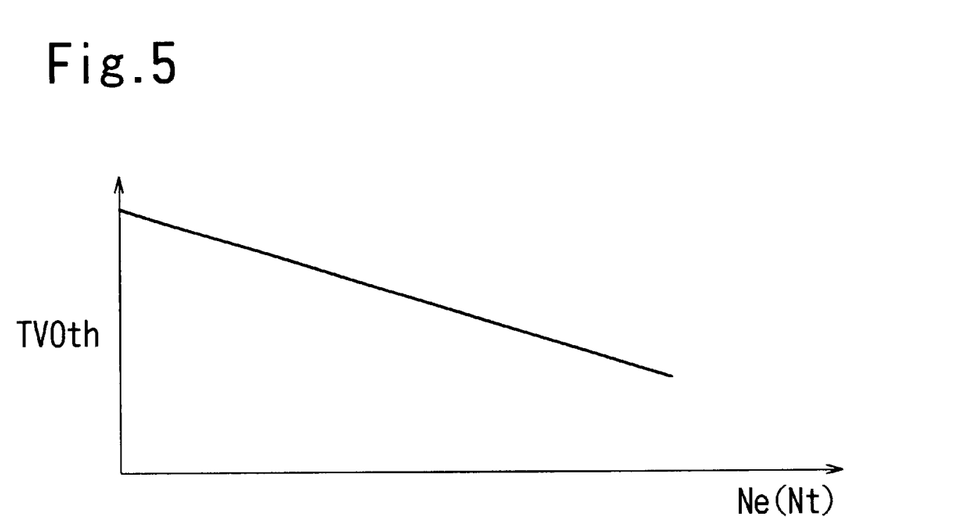
FIG. 5 is a view showing a setting of threshold value in a modified example.

In a modified example, instead of changing the threshold value TVOth according to the type of gear shift, the threshold value TVOth is set to be smaller for larger engine speed Ne or turbine speed Nt as shown in FIG. 5. This also similarly prevents shocks at each gear shift including those between low gear positions.

Although in the above embodiment the feedback control component PFB is set to zero, but it does not have to be exactly zero and lowering by just a predetermined amount is also possible.

Next, there will be described a second embodiment of the present invention.

Here, instead of inhibiting feedback control at the time of up-shift caused by releasing a foot from the accelerator pedal, the gradient of the target gear ratio of the feedback control is changed.

Figure 6:
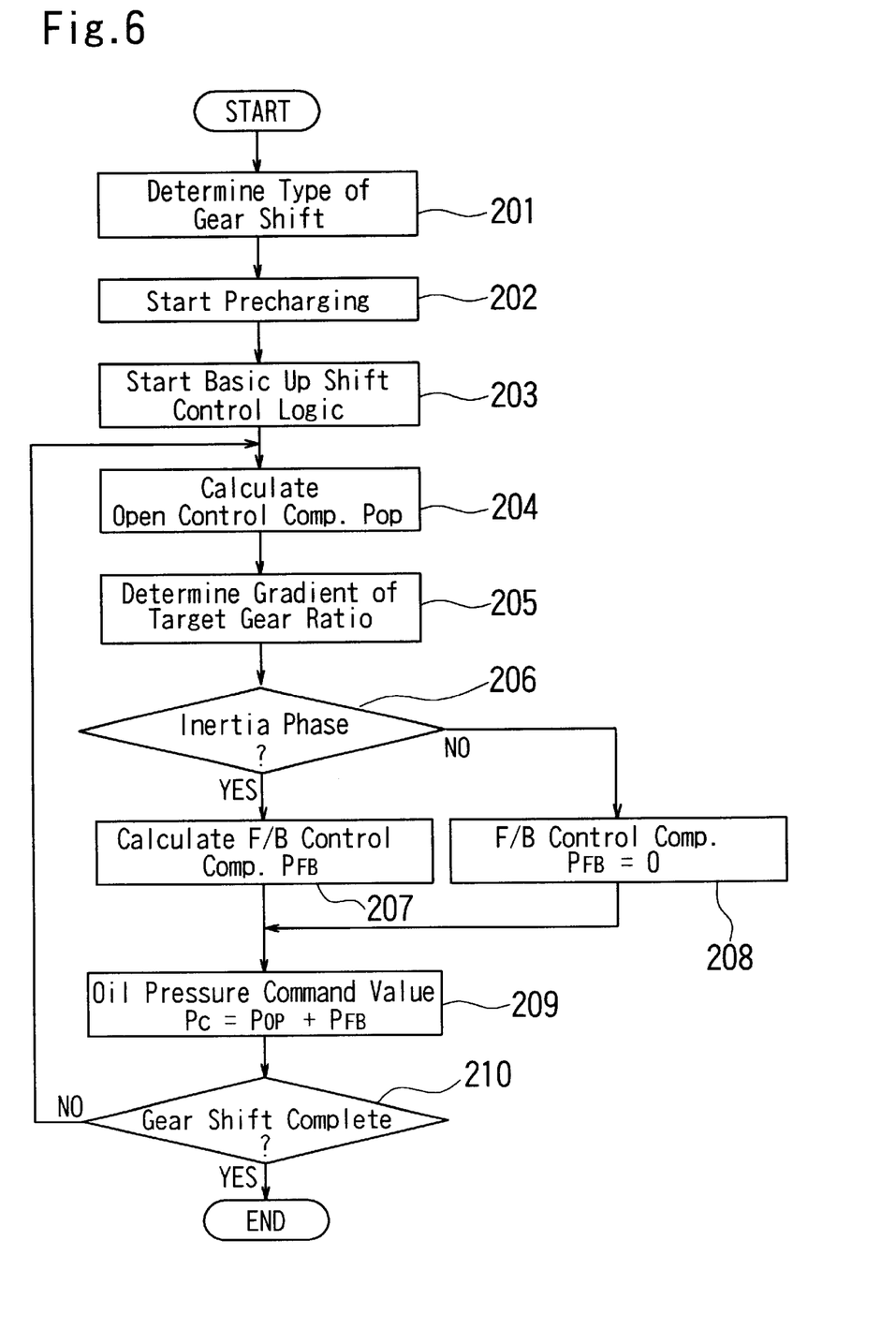
FIG. 6 is a flowchart showing the flow of oil pressure command value control during up-shift in a second embodiment.

FIG. 6 is a flowchart showing the flow of oil pressure command value control during up-shift in the second embodiment.

Step 201 to step 204 are the same as step 101 to step 104 shown in FIG. 2 in the aforementioned embodiment.

The open control component POP is calculated in step 204, and the gradient of the target gear ratio with respect to the amount of change ΔTVO in the throttle opening is calculated in step 205.

Figure 7:
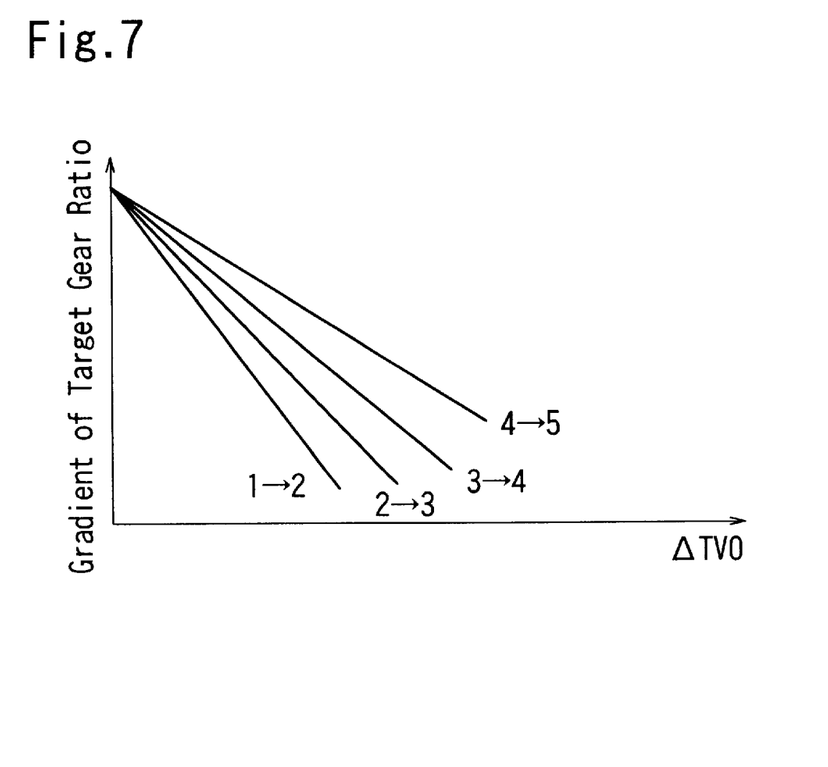
FIG. 7 is a view showing a setting of gradient of a target gear ratio for the amount of change in the throttle opening.

As shown in FIG. 7, the gradient of the target gear ratio is set in advance so as to be smaller when ΔTVO is larger, and is set according to the type of gear shift so as to be small for gear shift between low gear positions such as from first gear position to second gear position, etc., and relatively large for gear shift between high gear positions such as, for example, from fourth gear position to fifth gear position, etc.

In step 206, a check is made as to whether or not the gear shifting has entered inertia phase that is the control region where the feedback control should be adopted.

When the gear shifting has entered inertia phase, the process proceeds to step 207, and the target gear ratio is set based on the gradient determined in the step 205, and the feedback control component PFB is calculated with respect to the target gear ratio.

When the gear shifting has not entered inertia phase, the process proceeds to Step 208, to set the feedback control component PFB to zero.

After step 207 and step 208, in step 209, the feedback control component PFB is added to the open control component POP and the oil pressure command value Pc is obtained. The duty of the solenoid 8 is then controlled based on this oil pressure command value Pc and the gear shifting process is proceeded.

Step 204 onwards are then repeated until the gear shift is complete, with this up-shift control then being finished when end of the gear shift is detected in step 210.

Other aspects of the configuration are the same as those of the aforementioned embodiment.

In this embodiment as described above, the gradient of the target gear ratio is changed based on the amount of change ΔTVO in the throttle opening at the time of up-shift, and this gradient is made smaller for a larger ΔTVO. There is therefore no excessive feedback at the time of up-shift caused by releasing a foot from the accelerator pedal where the amount of change in the throttle opening is large, and the phenomena of a shock occurring is prevented.

Further, the gradient of the target gear ratio is changed according to the type of gear shift and is set particularly small for gear shift between low gear positions. Shocks can therefore be reliably prevented even in a gear shift between low gear positions where the change in engine speed is large.

Figure 8:
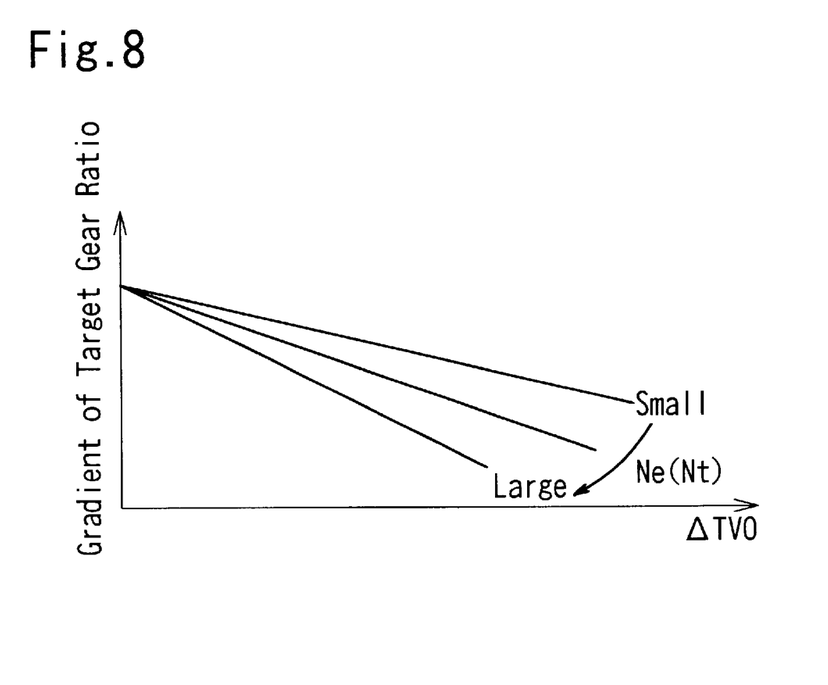
FIG. 8 is a view showing a setting of gradient of a target gear ratio in a modified example.

In a modified example, instead of changing the gradient of the target gear ratio according to the type of gear shift, the gradient of the target gear ratio can also be set to be smaller for larger engine speed Ne or turbine speed Nt as shown in FIG. 8. This therefore also similarly prevents shocks at each gear shift including gear shift between low gear positions.

Next, there will be described a third embodiment of the present invention.

Here, instead of inhibiting feedback control at the time of up-shift caused by releasing a foot from the accelerator pedal, the gain of the feedback control is changed.

Figure 9:
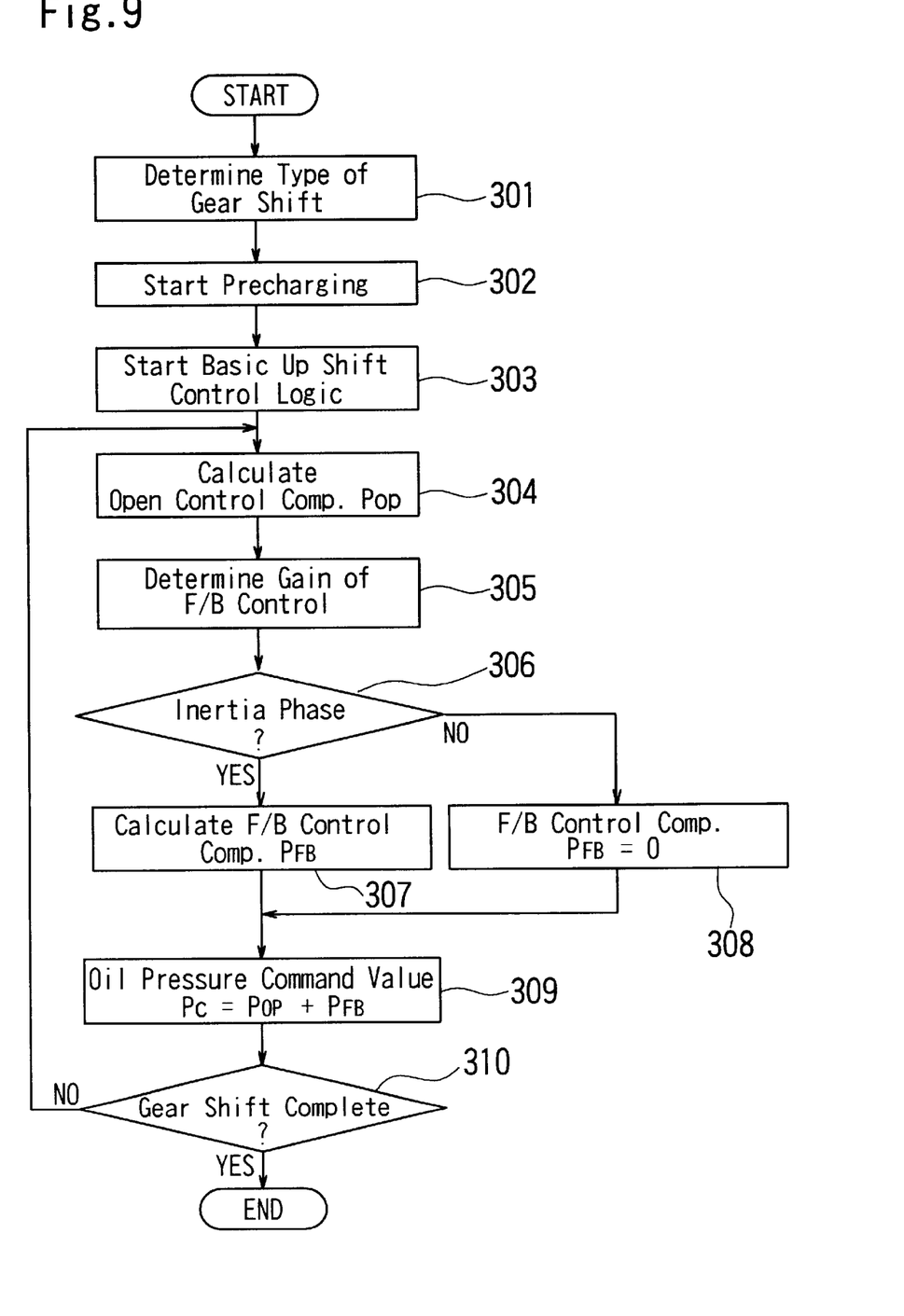
FIG. 9 is a flowchart showing the flow of oil pressure command value control during up-shift in a third embodiment.

FIG. 9 is a flowchart showing the flow of oil pressure command value control during up-shift in the third embodiment.

Step 301 to step 304 are the same as step 101 to step 104 shown in FIG. 2 in the first embodiment.

The open control component POP is calculated in step 304, and then the feedback control gain with respect to the amount of change ΔTVO in the throttle opening is determined in step 305.

Figure 10:
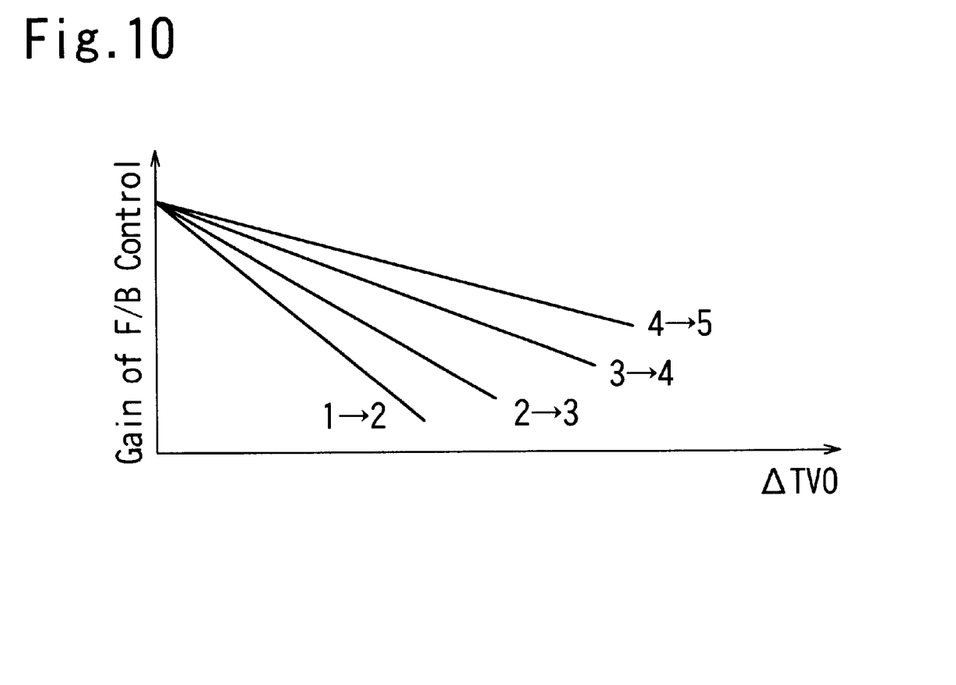
FIG. 10 is a view showing a setting of gain of feedback control for the amount of change in the throttle opening.

As shown in FIG. 10, the gain of the feedback control (F/B control gain) is set in advance so as to be smaller when ΔTVO is larger, and is set according to the type of gear shift so as to be small for gear shift between low gear positions such as from first gear position to second gear position, etc., and relatively large for gear shift between high gear positions such as, for example, from fourth gear position to fifth gear position, etc.

In step 306, a check is made as to whether or not the gear shifting has entered inertia phase that is the control region where the feedback control should be adopted.

When the gear shifting has entered inertia phase, the process proceeds to step 307, where the feedback control component PFB is calculated with respect to the basic target gear ratio according to the gain determined in step 305.

When the gear shifting has entered inertia phase, the feedback control component PFB is put to zero (PFB=0) in step 308.

After step 307 and step 308, instep 309, the feedback control component PFB is added to the open control component POP and the oil pressure command value Pc is obtained. The duty of the solenoid 8 is then controlled based on this oil pressure command value Pc and the gear shifting process is proceeded.

Step 304 onwards are then repeated until the gear shift is complete, with this up-shift control then being finished when end of the gear shift is detected in step 310.

Other aspects of the configuration are the same as those of the first embodiment.

In this embodiment as described above, the gain of the feedback control is changed based on the amount of change ΔTVO in the throttle opening at the time of up-shift, and gain is made smaller for a larger ΔTVO. There is therefore no excessive feedback at the time of up-shift caused by releasing a foot from the accelerator pedal where the amount of change in the throttle opening is large, and the phenomena of a shock occurring is prevented.

Further, the gain of the feedback control is changed according to the type of gear shift and is set particularly small for gear shift between low gear positions. Shocks can therefore be reliably prevented even in a gear shift between low gear positions where the change in engine speed is large.

Figure 11:
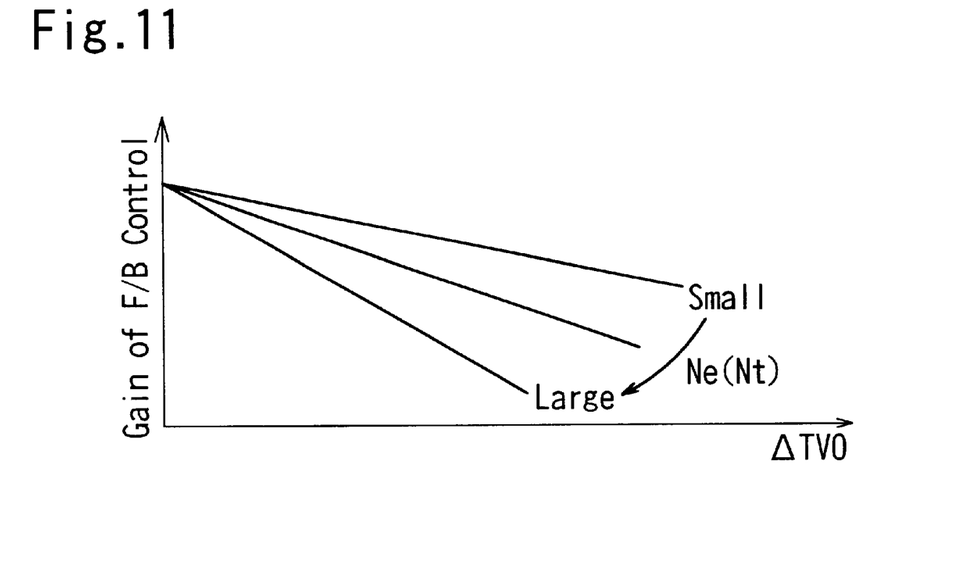
FIG. 11 is a view showing a setting of gain of feedback control in a modified example.

In a modified example, instead of changing the gain of the feedback control according to the type of gear shift, the gain of the feedback control is set to be smaller for larger engine speed Ne or turbine speed Nt as shown in FIG. 11. This therefore also similarly prevents shocks at each gear shift including gear shift between low gear positions.

What is claimed is:

1. A shift control system for automatic transmission, comprising:

a gear transmission mechanism having engaging devices that control gear positions with oil pressure, wherein during an up-shift from a first gear position to a higher second gear position, oil pressure is controlled with an open control component, a gradient of which is determined based on input torque, and a feedback control component based on a target gear ratio; and means for decreasing said feedback control component when the amount of change in a throttle opening at the time of the up-shift is equal to or greater than a predetermined threshold value.

2. A shift control system for automatic transmission according to claim 1, wherein said threshold value of the amount of change in the throttle opening is set according to a type of gear shift, so as to be small for gear shift between low gear positions and be large for gear shift between high gear positions.

3. A shift control system for automatic transmission according to claim 1, wherein said threshold value of the amount of change in the throttle opening is set smaller for higher engine or turbine speed.

4. A shift control system for automatic transmission, comprising:

a gear transmission mechanism having engaging devices that control gear positions with oil pressure, wherein during an up-shift from a first gear position to a higher second gear position, oil pressure is controlled with an open control component, a gradient of which is determined based on input torque, and a feedback control component based on a target gear ratio; and means for setting a gradient of said target gear ratio smaller for larger amounts of change in a throttle opening during an up-shift.

5. A shift control system for automatic transmission according to claim 4, wherein said gradient of the target gear ratio is set according to a type of gear shift, so as to be small for gear shift between low gear positions and be large for gear shift between high gear positions.

6. A shift control system for automatic transmission according to claim 4, wherein said gradient of the target gear ratio is set smaller for higher engine turbine speed.

7. A shift control system for automatic transmission, comprising:

a gear transmission mechanism having engaging devices that control gear positions with oil pressure, wherein during an up-shift from a first gear position to a higher second gear position, oil pressure is controlled with an open control component, a gradient of which is determined based on input torque, and a feedback control component based on a target gear ratio; and means for setting a gain of the feedback control component smaller for larger amounts of change in a throttle opening during an up-shift.

8. A shift control system for automatic transmission according to claim 7, wherein said gain of the feedback control component is set according to a type of gear shift, so as to be small for gear shift between low gear positions and be large for gear shift between high gear positions.

9. A shift control system for automatic transmission according to claim 7, wherein said gain of the feedback control is set smaller for higher engine turbine speed.

* * * * *